United States Patent [19]

Chen

[11] Patent Number: 5,685,202
[45] Date of Patent: Nov. 11, 1997

[54] BICYCLE PEDAL DEVICE WITH TWO CLEAT RETAINING UNITS

[76] Inventor: Chung-I Chen, No. 3, Kung-Chi Rd., Yu-Shih Industrial Dist., Ta-Chia Chen, Taichung Hsien, Taiwan

[21] Appl. No.: 596,641

[22] Filed: Feb. 5, 1996

[51] Int. Cl.[6] .................................................. G05G 1/14
[52] U.S. Cl. ............................... 74/594.6; 74/594.4
[58] Field of Search ......................... 74/594.4, 594.6; 36/131, 132

[56] References Cited

U.S. PATENT DOCUMENTS

| | | | |
|---|---|---|---|
| 4,932,287 | 6/1990 | Ramos | 74/594.6 |
| 5,048,369 | 9/1991 | Chen | 74/594.6 |
| 5,115,692 | 5/1992 | Nagano | 74/594.4 |
| 5,203,229 | 4/1993 | Chen | 74/594.6 |
| 5,259,270 | 11/1993 | Lin | 36/131 X |
| 5,419,218 | 5/1995 | Romano | 74/594.6 |
| 5,423,233 | 6/1995 | Peyre et al. | 74/594.4 X |
| 5,557,985 | 9/1996 | Nagano | 74/594.6 |

*Primary Examiner*—Vinh T. Luong
*Attorney, Agent, or Firm*—Dickinson, Wright, Moon, Van Dusen & Freeman

[57] ABSTRACT

A bicycle pedal device includes a pedal body, and upper and lower cleat retaining units mounted respectively on two opposite side surfaces of the pedal body. The pedal body includes a tubular portion adapted to be mounted rotatably on a bicycle pedal shaft, and a pair of front and rear U-shaped frame sections integrally formed with two sides of said tubular portion. Each of the U-shaped frame sections has two transverse bar sections which extend integrally and transversely from the tubular portion, and an axial bar section which interconnects the outer ends of the transverse bar sections so as to define a pair of front and rear spaces each of which is located between the tubular portion and one of the axial bar sections. The cyclist's shoe can be retained on the pedal body by either of the cleat retaining units.

2 Claims, 4 Drawing Sheets

5,685,202

BICYCLE PEDAL DEVICE WITH TWO CLEAT RETAINING UNITS

BACKGROUND OF THE INVENTION

1. Field of the Invention

This invention relates to a pedal device, more particularly to a bicycle pedal device which includes a pedal body with two cleat retaining units.

2. Description of the Related Art

Devices of the type which permit easy positioning and rapid disengagement of a cyclist's shoe from a bicycle pedal device without deliberate intervention are known in the art. FIGS. 1 and 2 respectively show exploded and cross sectional views of a conventional pedal device that comprises mainly a cleat 1 adapted to be fixed on the bottom surface of the sole of a cyclist's shoe and a pedal body 2 mounted rotatably on a pedal shaft 21 of a bicycle for retaining the cleat 1 on the pedal body. The cleat 1 has a curved insert piece 12 which is retained by a claw portion 22 on the pedal body 2, and a curved rear end portion 13 with a pair of generally triangular bottom plates 131. The pedal body 2 further has a pair of rearwardly movable jaw members 25 which resiliently hold the bottom plates 131 and which allow the disengagement of the cleat 1 from the pedal body 2 only when the heel of the shoe pushes the jaw members 25 outwardly.

Because the front claw member 22 and the rear jaw members 25 are provided on the top surface of the pedal body 2, when the bottom surface of the pedal body 2 is turned upward, the conventional pedal device cannot mount the shoe of the cyclist thereon.

SUMMARY OF THE INVENTION

Therefore, the object of this invention is to provide a bicycle pedal device which includes a pedal body with two cleat-retaining units respectively mounted on two opposite side surfaces of the pedal body so as to retain the shoe of the cyclist on either of the side surfaces of the pedal body.

Accordingly, the bicycle pedal device of this invention includes a pedal body, and upper and lower cleat retaining units mounted respectively on two opposite side surfaces of the pedal body. The pedal body includes a tubular portion adapted to be mounted rotatably on a bicycle pedal shaft, and a pair of front and rear U-shaped frame sections integrally formed with two sides of the tubular portion. Each of the U-shaped frame sections has two transverse bar sections which extend integrally and transversely from the tubular portion, and an axial bar section which interconnects the outer ends of the transverse bar sections so as to define a pair of front and rear spaces each of which is located between the tubular portion and one of the axial bar sections.

The upper cleat-retaining unit includes a front claw member which is fixed on a top surface of the front U-shaped frame section and which is adapted to retain a front portion of a cleat on the pedal body, a rear bolt threaded within the rear U-shaped frame section so as to extend through the rear space in a direction parallel to the tubular portion, two rotatable rear jaw members sleeved rotatably on the rear bolt, and a pair of rear torsional springs which are sleeved on the rear bolt and which bias the rear jaw members to retain a rear portion of the cleat on the pedal body. The lower cleat-retaining unit includes a rear claw member fixed on a bottom surface of the rear U-shaped frame section, a front bolt threaded within the front U-shaped frame section so as to extend through the front space in a direction parallel to the tubular portion, two rotatable front jaw members sleeved rotatably on the front bolt, and a pair of front torsional springs sleeved on the front bolt. When turned an angle of 180 degrees about the tubular portion, the lower cleat retaining unit can be adapted to retain the cleat on the pedal body.

BRIEF DESCRIPTION OF THE DRAWINGS

Other features and advantages of this invention will become more apparent in the following detailed description of the preferred embodiment with reference to the accompanying drawings, in which.

DETAILED DESCRIPTION OF THE PREFERRED EMBODIMENT

Figure 1:
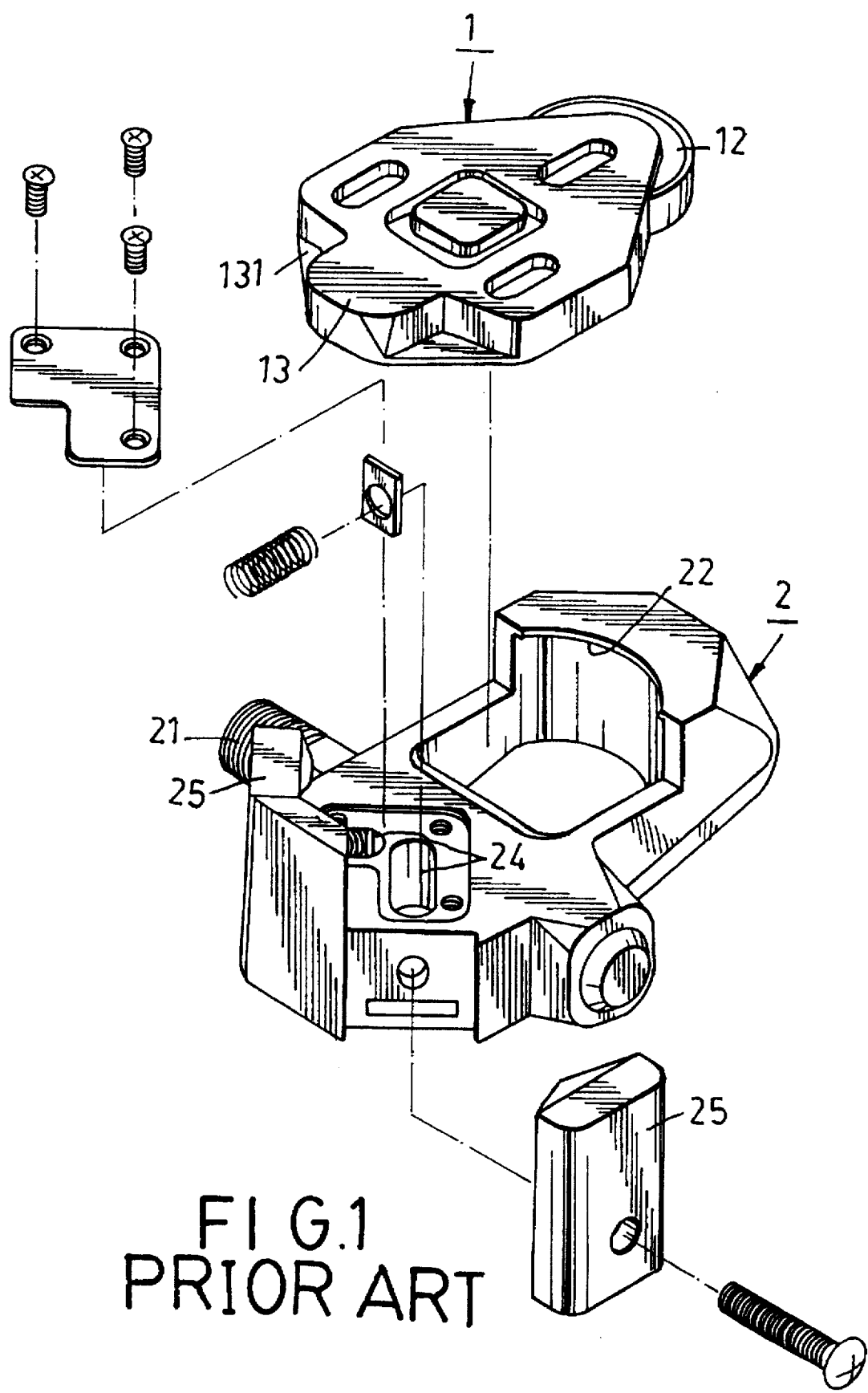
FIG. 1 is an exploded view of a conventional bicycle pedal device.
Figure 2:
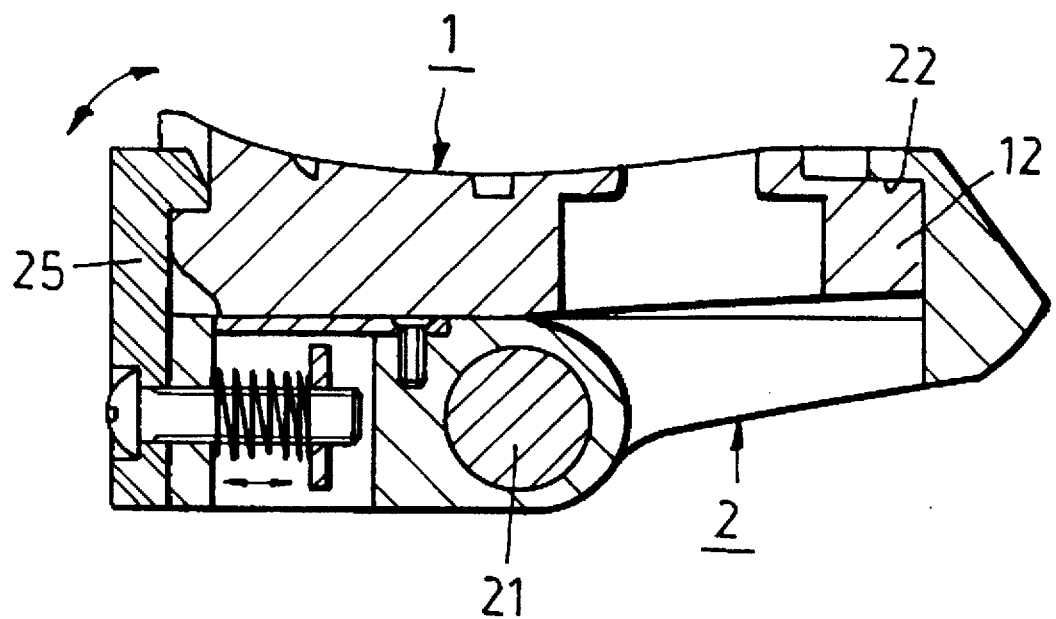
FIG. 2 is a sectional view of the conventional bicycle pedal device shown in FIG. 1.
Figure 3:
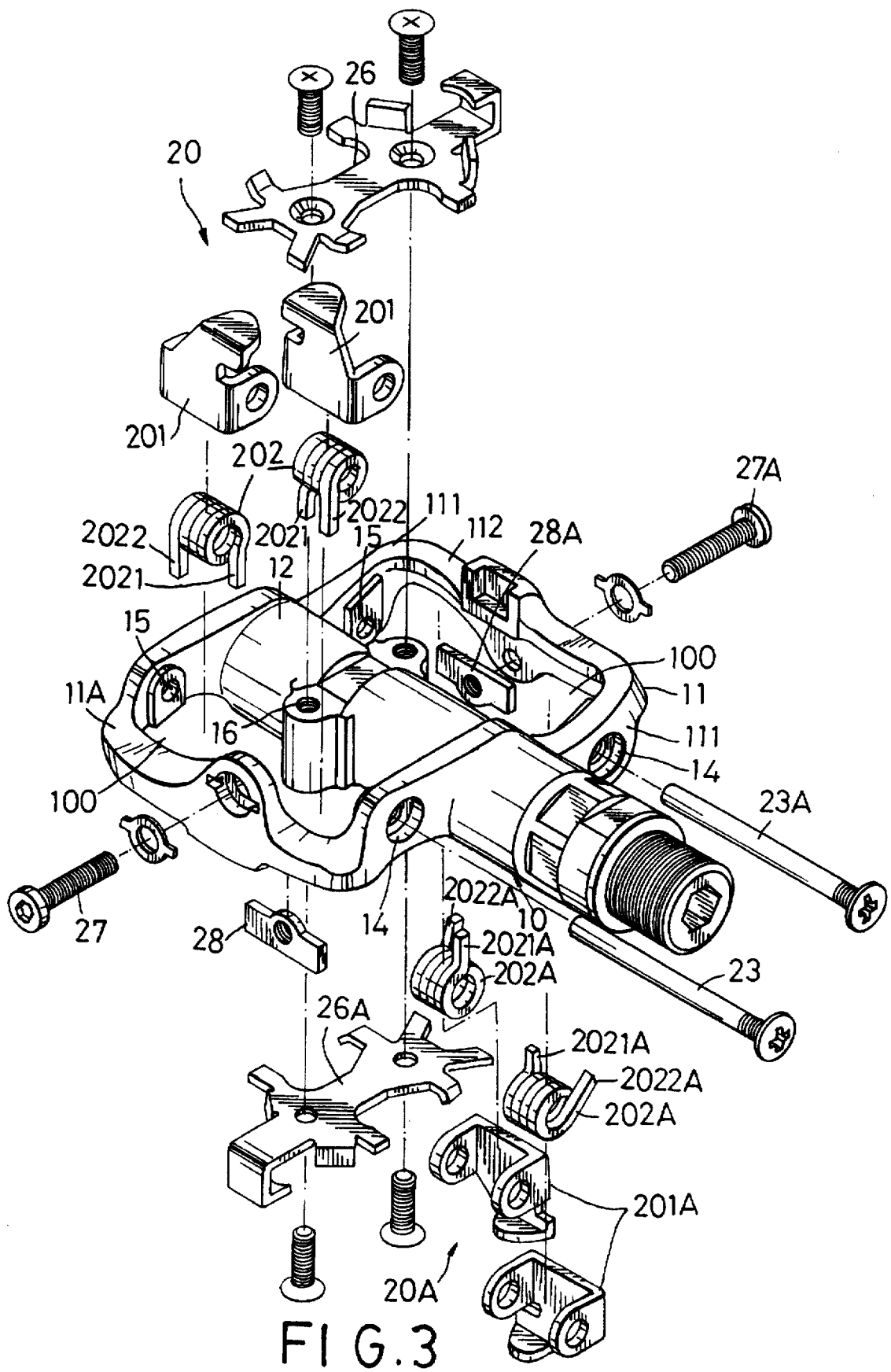
FIG. 3 is an exploded view of a bicycle pedal device of this invention.

Referring to FIG. 3, a bicycle pedal device of this invention includes a pedal body 10, and upper and lower cleat retaining units 20, 20A mounted respectively on two opposite side surfaces of the pedal body 10.

As illustrated, the pedal body 10 includes a tubular portion 12 adapted to be mounted rotatably on a bicycle pedal shaft (not shown), and a pair of front and rear U-shaped frame sections 11, 11A. Each of the frame sections 11, 11A has two transverse bar sections 111 extending integrally and transversely from the tubular portion 12, and an axial bar section 112 which interconnects the outer ends of the transverse bar sections 111 so as to define a pair of front and rear spaces 100 each of which is located between the tubular portion 12 and one of the axial bar sections 112. Thus, the frame sections 11, 11A are integrally formed with two sides of the tubular portion 12.

The upper cleat-retaining unit 20 includes a front claw member 26 fixed on a top surface of the front U-shaped frame section 11 in a known manner, a rear bolt 23 threaded in the threaded holes 14, 15 of the rear U-shaped frame section 11A so as to extend through the rear space 100 in a direction parallel to the tubular portion 12, two rotatable rear jaw members 201 sleeved rotatably on the rear bolt 23, and a pair of rear torsional springs 202 which are sleeved on the rear bolt 23 and which bias the rear jaw members 201 to turn frontward.

Figure 5:
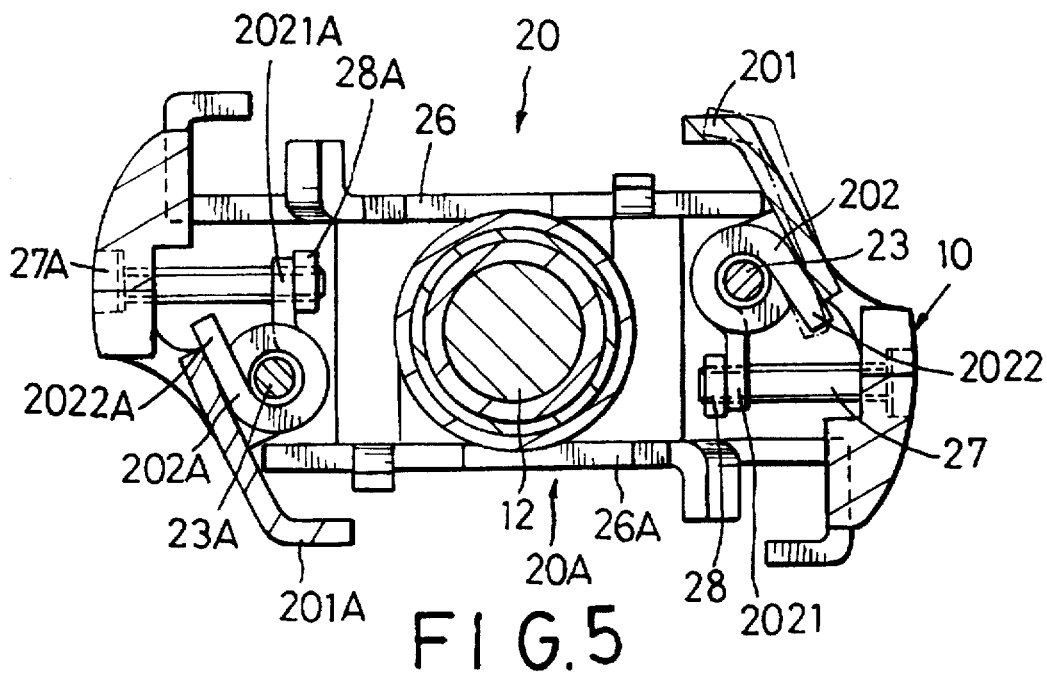
FIG. 5 is a sectional view of the bicycle pedal device of this invention taken along lines V—V of FIG. 4.

With reference particularly to FIGS. 3 and 5, the torsional springs 202 and 202A include ends 2021 and 2021A, respectively, which engage movable rear mounting plate 28 and movable front mounting plate 28A. The mounting plates are, in turn, held by threaded adjustment bolts 27 and 27A to allow adjustment of the tension on the torsional springs. The torsional springs also include ends 2022 and 2022A, which engage the jaw members 201 and 201A. The tension on the torsional springs and, thus, the resistance applied by the jaws, may easily be set by rotation of the adjustment bolts 27 and 27A.

The lower cleat retaining unit 20A includes a rear claw member 26A fixed on the bottom surface of the rear U-shaped frame section 11A, a front bolt 23A threaded in the threaded holes 14, 15 of the front U-shaped frame section 11 so as to extend through the front space 100 in a direction parallel to the tubular portion 12, two rotatable front jaw members 201A sleeved rotatably on the front bolt 23A, and a pair of front torsional springs 202A sleeved on the front bolt 23.

Figure 4:
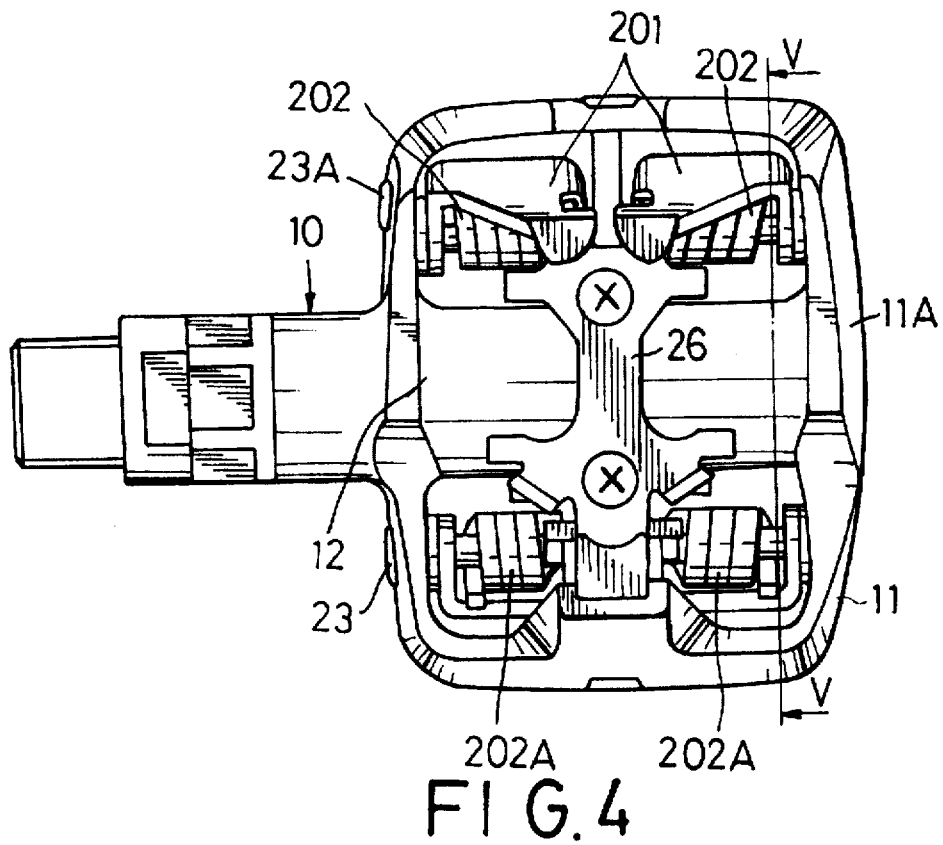
FIG. 4 is a top view of the bicycle pedal device of this invention.

Referring to FIG. 4, in use, the front portion of a cleat (not shown) of a cyclist's shoe is retained in the front claw member 26 while the rear portion of the cleat is retained by the rear jaw members 201 of the pedal body 10. The cyclist only needs to move the shoe sideways of pedal body 10 in order to disengage the cleat from the upper cleat retaining unit of the pedal body 10.

As illustrated in FIG. 5, when turned an angle of 180 degrees about the tubular portion 12, the lower cleat retaining unit 20A of the pedal body 10 can be used to hold the cleat of the cyclist's shoe.

With this invention thus explained, it is obvious to those skilled in the art that various modifications and variations can be made without departing from the scope and spirit thereof. It is therefore intended that the invention be limited only as in the appended claims.

I claim:

1. A bicycle pedal device comprising:

a pedal body including a tubular portion adapted to be mounted rotatably on a bicycle pedal shaft, and a pair of front and rear U-shaped frame sections integrally formed with two sides of said tubular portion, each of said U-shaped frame sections having two transverse bar sections extending integrally and transversely from said tubular portion, and an axial bar section interconnecting outer ends of said transverse bar sections so as to define a pair of front and rear spaces each of which is located between said tubular portion and one of said axial bar sections;

an upper cleat-retaining unit including a front claw member which is fixed on a top surface of said front U-shaped frame section and which is adapted to retain a front portion of a cleat on said pedal body, a rear bolt threaded within said rear U-shaped frame section and extending through said rear space in a direction parallel to said tubular portion, two rotatable rear jaw members sleeved rotatably on said rear bolt, and a pair of rear torsional springs sleeved on said rear bolt for biasing said rear jaw members to retain a rear portion of the cleat on said pedal body; said rear torsional springs having first ends engaging said rear jaw members and second ends engaging a rear plate movable transversely to said direction for adjusting the tension in said torsional springs, and a lower cleat retaining unit including a rear claw member fixed on a bottom surface of said rear U-shaped frame section, a front bolt threaded within said front U-shaped frame section and extending through said front space in a direction parallel to said tubular portion, two rotatable front jaw members sleeved rotatably on said front bolt, and a pair of front torsional springs sleeved on said front bolt, said front torsional springs having first ends engaging said front jaw members and second ends engaging a front plate movable transversely to said direction for adjusting the tension in said torsional springs, said lower cleat retaining unit being capable of turning an angle of 180 degrees about said tubular portion so as to be adapted to retain the cleat on said pedal body.

2. A bicycle pedal device according to claim 1 further comprising a rear adjustment bolt engaging said rear plate for moving said rear plate upon rotation of said rear adjustment bolt and a front adjustment bolt engaging said front plate for moving said front plate upon rotation of said front adjustment bolt.

* * * * *